United States Patent [19]

King

[11] 3,748,449

[45] July 24, 1973

[54] DEVICE FOR DETERMINING THE MEDIAN NUMBER IN A SERIES OF NUMBERS

[75] Inventor: Richard A. King, Singapore, Singapore

[73] Assignee: Litton Systems, Inc., Beverly Hills, Calif.

[22] Filed: Dec. 2, 1971

[21] Appl. No.: 204,140

[52] U.S. Cl. .................................. 235/152, 235/156

[51] Int. Cl. ................................................ G06f 7/48

[58] Field of Search .................... 235/152, 156, 193; 328/158; 307/203; 340/172.5

[56] References Cited

UNITED STATES PATENTS

| | | | |
|---|---|---|---|
| 3,371,200 | 2/1968 | Funk | 235/193 |
| 3,495,081 | 2/1970 | Mensa | 235/193 |
| 3,557,354 | 1/1971 | Trimble | 235/152 |
| 3,591,785 | 7/1971 | Miller | 328/158 X |

*Primary Examiner*—Eugene G. Botz
*Assistant Examiner*—David H. Malzahn
*Attorney*—A. C. Rose, Harold E. Gillmann et al

[57] ABSTRACT

Circuitry for determining the median character in a sequence of characters in a predetermined number system comprising a shift register for receiving the input sequence of units characters and shifting the units characters to a predetermined location in the shift register, a binary counter for counting the number of shifts in the shift register plus counting the number of alternate characters in the sequence of characters to indicate the median units character in the sequence, and a logic circuit for receiving signals representing the "tens" characters in the sequence from which the median is to be determined. The logic circuit determining the "tens" character of the median number in the sequence by determining the lowest "tens" of character initially received and by increasing its output determination by one each time the binary units counter counts more than the number of units character of its radix.

3 Claims, 3 Drawing Figures

United States Patent [19]
King
[11] 3,748,449
[45] July 24, 1973
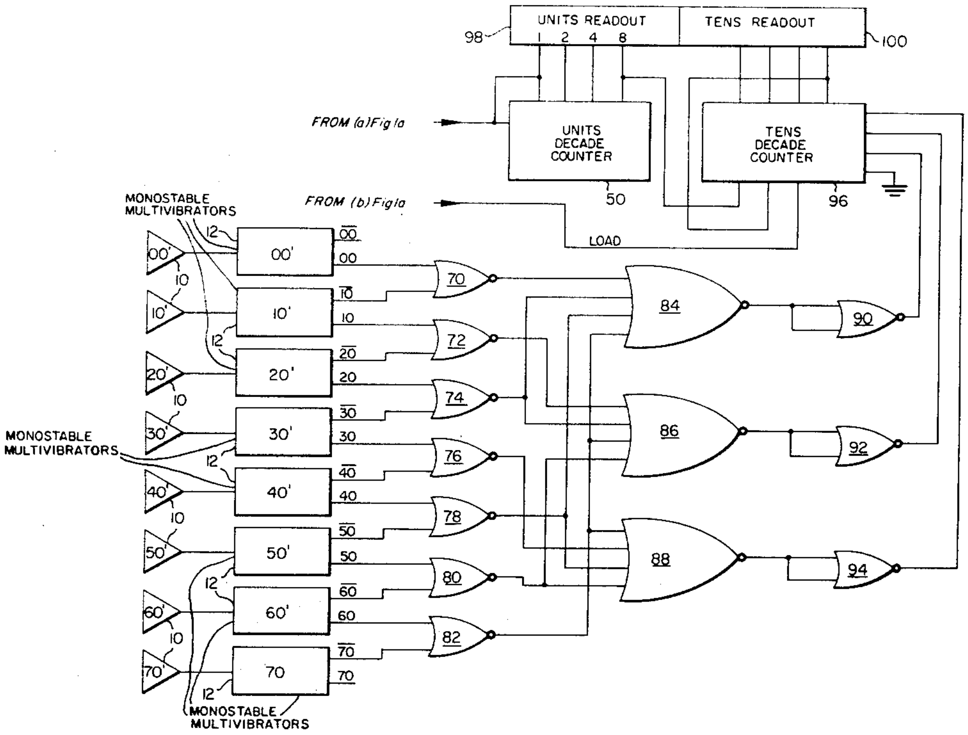

PATENTED JUL 24 1973

3,748,449

SHEET 1 OF 3

RICHARD A. KING

INVENTOR

BY Harold E. Gillmann

ATTORNEY

RICHARD A. KING

INVENTOR

BY Harold E. Gillmann

ATTORNEY

RICHARD A. KING
INVENTOR

BY Harold E. Gillmann
ATTORNEY

DEVICE FOR DETERMINING THE MEDIAN NUMBER IN A SERIES OF NUMBERS

BACKGROUND OF THE INVENTION

This invention relates to electronic circuits utilizing shift registers and counters to produce a desired output signal from a train of digital input signals.

SUMMARY OF THE INVENTION

A shift register, logic circuitry and a pair of binary counters are connected to determine the median number in a sequence of numbers represented by binary signals. The unit characters in the sequence of numbers are loaded in the shift register. In response to a clock pulse the characters are shifted in the register until a signal corresponding to the first unit character in the sequence is shifted to the bit storage position in the register of least significance at which time shifting ends. A binary counter counts the number of clock pulses occurring during the period of shifting plus counts the number of alternate storage positions in the shift register in which a signal corresponding to a unit character in the sequence of numbers is stored at the end of shifting thereby determining the median unit character in the sequence. Logic circuitry also determines the signal representing the lowest second order character in the sequence to determine the second order character of the median number in the sequence. The logic circuitry further increases the second order of character of the median number by one whenever the counter counts a number of pulses in excess of the radix of the lowest order characters.

DESCRIPTION OF THE PREFERRED EMBODIMENT

Figure 1A:
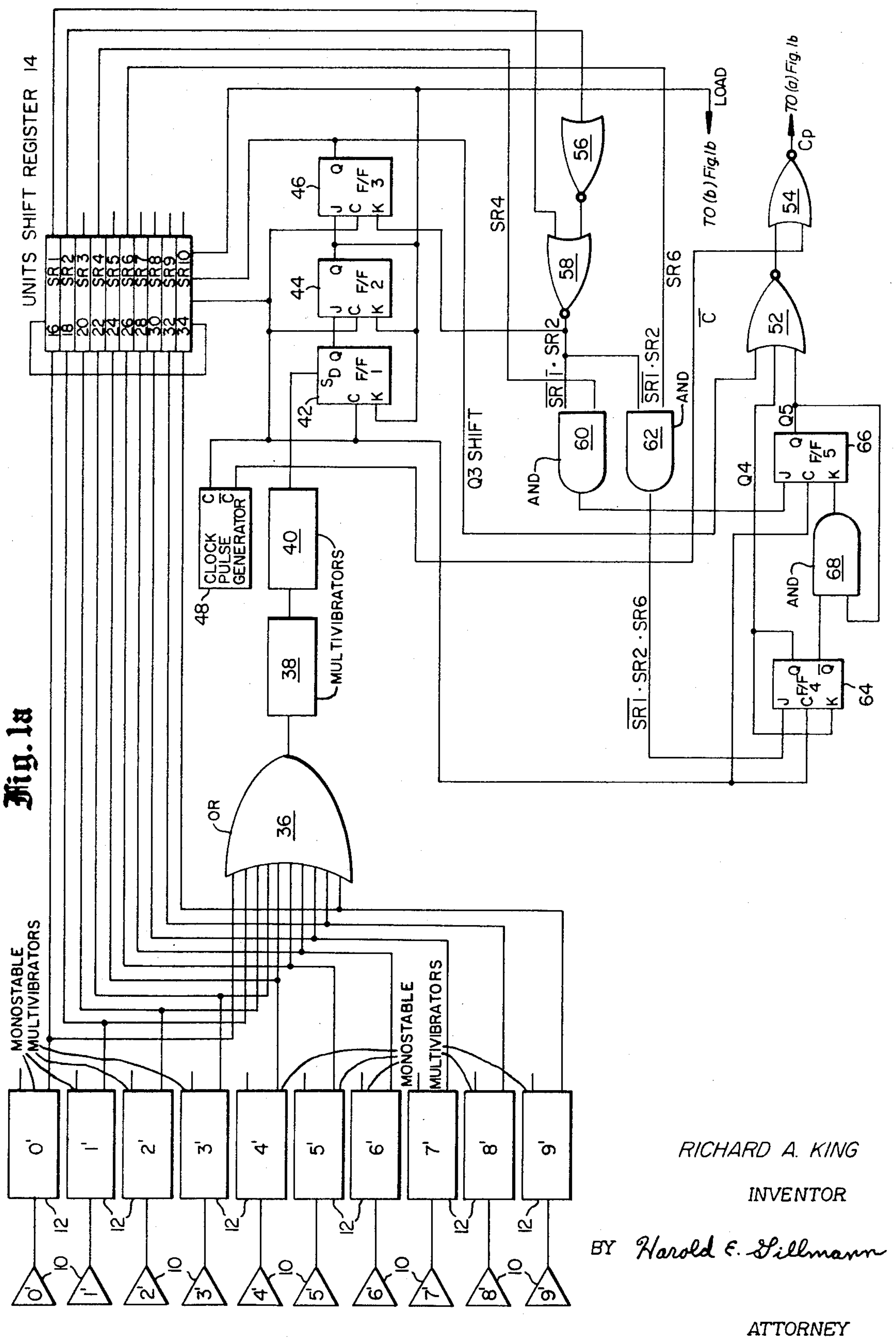
FIGS. 1*a* and 1*b* are logic diagrams illustrating the preferred embodiment of the invention.
Figure 1B:
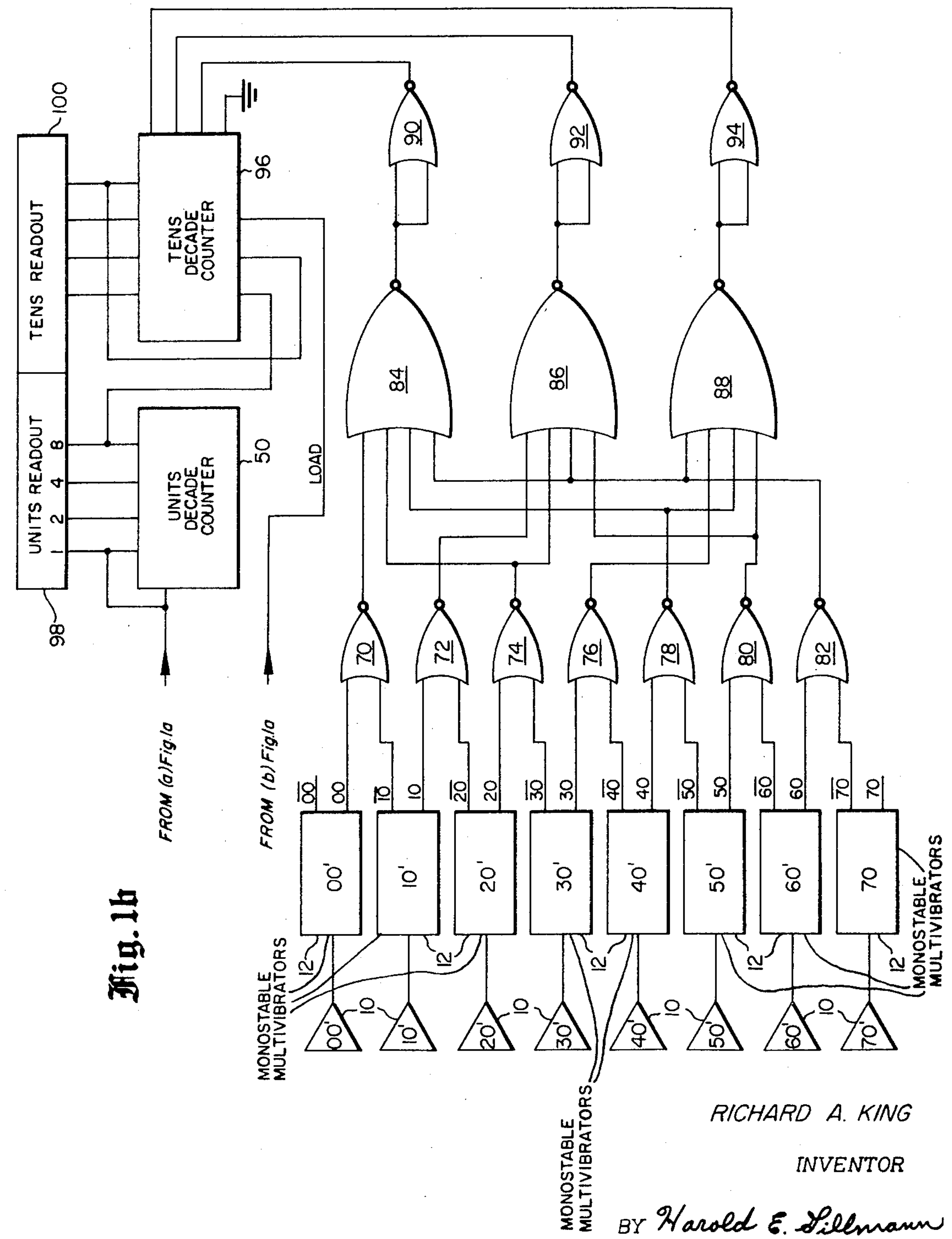

FIGS. 1*a* and 1*b* is a logic diagram illustrating the preferred embodiment of the invention. A sequence of signals representing numbers for which the median is to be determined, is applied to the inputs of a plurality of amplifiers 10. For the embodiment shown in FIGS. 1*a* and 1*b*, the binary input signals are coded in the decimal number system. The amplifiers are divided into two sets with one amplifier 10 corresponding to each "units" character zero through nine and one amplifier 10 corresponding to each "tens" or second order character of interest. For example in FIGS. 1*a* and 1*b*, there are seven "tens" amplifiers 10. Thus, the plurality of amplifiers 10 is capable of receiving the set of binary coded decimal numbers 0 through 79. Of course, the number of "tens" amplifiers 10 may be increased according to the concept illustrated. The set of signals representing decimals numbers 0′–79′ contains a sequence of numbers for which it is desired to obtain the median number. Decimal numbers are primed herein to distinguish from numerals referencing items in the drawings. Assume, for example, the input signals to amplifiers 10 represent the decimal sequence 38′, 39′, 40′, 41′, 42′. This decimal sequence is used hereinafter as an example. For this sequence, the input to the 8′, 9′, 0′, 1′ and 2′ "units" amplifier will be logic state one and the input to all other "units" amplifiers will be logic state zero. Similarly, the input to the 30′ and 40′ "tens" amplifier will be logic state one and the input to all other "tens" amplifiers will be the zero logic state. Each amplifier 10 changes its output level in accordance with the level or state of its input signal. For example, a "1" at the input to each amplifier 10 results in a "1" at the output.

It is to be expressly understood that the invention is not limited to signals in a number system having a radix 10. Amplifiers 10 may be grouped according to any predetermined number system. Further, it is not necessary that the radix of the "units" set of signals be equal to the radix of the second order set of signals. For example, the set of binary signals received by amplifiers 10 could be divided into 20 second order signals received by 20 corresponding amplifiers 10 and further divided into 18 "units" characters within each second order character with 18 corresponding "units" amplifiers 10. Also, it is to be understood that the invention is not limited to determining the median of an odd numbered sequence of signals. A median number need not be an integer, of course, for an even numbered sequence of input characters. A system embodying the invention will determine the next lower whole number as the median.

It should also be understood, however, that the sequence of numbers for which a median is to be determined must include a sequence of consecutive numbers in the chosen number system. The number of input numbers in a sequence of numbers for which the median is to be determined must be less or equal to the radix. Of course, the radix of the "units" characters may be selected as discussed above.

The binary signal at the output of each amplifier 10 is coupled to a corresponding monostable multivibrator 12 which introduces a time delay $T_1$ in the signal. Each monostable multivibrator 12 is a delay flip-flop which, when activated, causes the device to assume the corresponding output state for a fixed period of time and then returned to the former state. A time delay is introduced in the signals in order to avoid sampling the signals before they have all changed state. The leading edges of the signals to be sampled may not be in synchronism. Also, for signals of extremely short duration, a "memory" of several milliseconds facilitates calculation.

From the output of the monostable multivibrator 12 the circuitry for the "units" signals and the "tens" signals is no longer indentical. The remaining circuitry for the "units" signals is discussed first.

The "units" signals from the monostable multivibrators 12 are routed to a "units" shift register 14 and to logic circuitry for controlling the loading and shifting of the register. The sequence of signals will be shifted in the register for the purpose of determining the number of unit characters from and including the least significant unit character to the first character of the sequence for which the mėdian character is to be determined. For the example stated, 38′, 39′, 40′, 41′ and 42′, unit characters 8′, 9′, 0′, 1′ and 2′ will be shifted serially until the signal representing the first unit character of the sequence, 8′, is stored in the flip-flop corresponding to the least significant unit character.

A register is a device capable of retaining binary information and is used in the subject device to hold one word temporarily. A register usually has as many flip-flops as there are bits in a word of information to be stored. However, any of the memory devices can be used to construct the register. In the instant case, register 14 has flip-flops 16, 18, . . . 32 and 34. Each bit in the register corresponds to one character of the "units" signals received by amplifier 10. It should be noted that "unit" signal 9' is coupled to flip-flop 34 of shift register 14, "units" signal 8' is coupled to flip-flop 32 and so forth. For convenience in following the timing diagram of FIG. 2, flip-flops 16, 18, . . . 34 are correspondingly labeled SR 1, SR2, . . . SR 10. Logic terms utilizing signals from flip-flops 16–34 will hereinafter be expressed in SR and $\overline{SR}$ notation.

The output signals from the "units" monostable multivibrators 12 are also presented to OR gate 36. The logical OR of all the "units" monostable multivibrator output signals is used to trigger another monostable multivibrator 38. Multivibrator 38 has a time delay of $T_2$. The time delay of $T_2$ may be approximately one-half that of $T_1$. The trailing edge of the output signals from monostable multivibrator 38 is used to trigger another monostable multivibrator 40. Multivibrator 40 has the time delay of $T_3$. In practice $T_1$ is greater than $T_2$ which is greater than $T_3$. The time delays $T_1$, $T_2$ and $T_3$ assure that the state of the "units" multivibrators 12 is sampled at the center of its pulse width, so that any leading edge skew is not a problem.

Flip-flops 42 and 44 buffer the output of monostable multivibrator 40. Bi-stable multivibrator 44 creates a LOAD signal one clock pulse in duration. In the preferred embodiment, multivibrators operate according to J-K logic which is well known in the art. The Q output of flip-flop 42 is coupled to the J input of flip-flop 44. The output signal from multivibrator 44 is utilized as a LOAD pulse. The LOAD pulse causes the "units" configuration of "ones" and "zeros" presented to the bit positions of unit shift register 14 to be entered into the unit shift register SR 1 through SR 10. "Units" character zero is the input for SR 1, "units" character one is the input for SR 2, etc. The shifting of the units shift register 14 is controlled by flip-flop 46 the output signal of which is called SHIFT. Flip-flop 46 is a bi-stable multivibrator operating according to J-K logic. Units shift register 14 is permitted to shift until the configuration $\overline{SR\ 1} \cdot SR\ 2$ is detected by circuitry which is described below. The configuration $\overline{SR\ 1} \cdot SR\ 2$ occurs when the flip-flop 16 (SR 1) is at the "0" state and flip-flop 18 is at a "1" state. A "1" state of flip-flop 18 is an indication that the first bit of the sequence of numbers for which the median is to be determined has been transferred to flip-flop 18.

Clock pulses from clock pulse generator 48 are applied to "units" shift register 14 for controlling the time of shifting. As long as the SHIFT signal from flip-flop 46 is logical one, the occurence of each clock pulse, $C_p$, causes the signals stored by the bits of "units" shift register 14 to shift serially down the chain of flip-flops 34, 32, . . . 18 and 16.

For each shift of "units" shift register 14, one clock pulse, $C_p$ is gated to the "units" decade counter 50 through NOR gate 52 and 54. The logic of NOR gates 52 and 54 is discussed below. Counter 50 counts the $C_p$ pulses to detemine the number of unit characters from and including the least significant character to the median character of the sequence to be decoded. "Units" decade counter 50 is a standard binary counter which counts input pulses. In the preferred embodiment counter 50 has a binary coded decimal output count. Each decimal digit of the output signal from the counter is represented by a combination of four binary digits or bits. The final count from counter 50 for each sequence of numbers received by amplifiers 10 will be the median unit character in the sequence. For the sample sequence 38 through 42 the median units character is zero.

In order to obtain the median character count, it is necessary, in addition to counting unit characters from and including the least significant character to the start of the sequence, to determine the median number in the sequence. For example, in the sequence 8', 9', 0', 1' and 2' it is necessary to determine that zero is the median count of this sequence. Logic circuitry is utilized to stop the shifting of "units" shift register 14 and to determine the median count of the sequence. In the preferred embodiment, this logic circuitry comprises a selection of NOR gates, AND gates and flip-flops.

Consider now the logic circuitry which controls the shifting of "units" shift register 14 and the gating of clock pulses, $C_p$, to "units" decade counter 50. "Units" shift register 14 responds to a shift signal $Q_3$ from flip-flop 46. The input signals from monostable multivibrators 12 are serially shifted in the register until the shift signal from flip-flop 46 changes state to logical zero. NOR gates 56 and 58 develop the logic signal $\overline{SR\ 1} \cdot SR\ 2$. The output of NOR gate 58 is coupled to the K input of flip-flop 46. Signals SR 1, SR 2 and $\overline{SR\ 2}$ are coupled to NOR gates 56 and 58 from flip-flops 16 and 18 (SR 1 and SR 2) of "units" shift register 14. Thus the "units" in the sequence for which the median is to be determined are shifted in the register until the lowest value unit signal is stored in flip-flop 18 (i.e. SR 2 is true, SR 1 is false). The next clock pulse shifts the data in the register one more time, while flip-flop 46 is turning off, ending the shifting cycle of the "units" shift register. The number of clock pulses required to shift the data to this point is equal to the number of logic "zeros" in the input data prior to the first logic "one."

Clock pulses are gated to the "units" decade counter 50 by a logic circuit comprising AND gates 60 and 62, flip-flop 64, flip-flop 66, AND gates 68 and NOR gates 52 and 54. The logic circuits control the total number of clock pulses gated to the "units" decade counter for each word loaded in shift register 14. The number of clock pulses gated to decade counter 50 is equal to the number of shifts occuring in shift register 14 plus one clock pulse for every other bit of the word stored in shift register 14. The total number of counts by the decade counter 50 is thus equal to the number of characters of the first set of input signals from and including the character of lowest significance to and including the median character in the sequence of characters in the first set of binary signals having a predetermined logical state.

The clock pulse, $\overline{C}_p$, is gated to "units" decade counter only when the logic condition $(Q_3 + Q_4 + Q_5)$ is true. $Q_3$ is the shift signal from flip-flop 46 which was discussed above. The J input of flip-flop 64 is triggered by AND gate 62. AND gate 62 has a true output signal if the condition $\overline{SR\ 1} \cdot SR\ 2 \cdot SR\ 6$ is satisfied. $Q_4$, the output signal from flip-flop 64, will be set true if the output of the AND gate 62 is true.

$Q_5$, the output signal from flip-flop 66, is a function of the inputs to AND gate 60 which in turn controls the state of flip-flop 66. The output of AND gate 60 becomes true if the term $\overline{SR\ 1} \cdot SR\ 2 \cdot SR\ 4$ is true. Therefore, $Q_5$ is set true if shifting has been completed, making $\overline{SR\ 1}$ · SR 2 true, and the fourth bit of the word stored in unit shift register 14, SR 4, is true. Thus, the logic circuitry will gate clock pulses to "units" decade counter 50 as long as the shift signal, $Q_3$ is true, and, in addition, it will gate an additional clock pulse to the counter 50 for each alternate bit of the word that is true. In the embodiment shown in FIG. 1 the fourth and sixth bits, SR 4 and SR 6, are sampled to determine whether they have the predetermined logical state, i.e. true at the end of shifting. In order to stop the counting of "units" decade counter 50, enough bits must be sampled until a character or bit not having predetermined state occurs. The embodiment shown in FIG. 1 would be limited to determining the median or sequence of characters having a maximum of five bits. Of course, the logic for sampling additional bits could be extended in the manner taught above to sample alternate bits of word of any desired length.

Counting in "units" decade counter 50 ceases when both $Q_4$ and $Q_5$ are no longer true. $Q_4$ is set false one clock pulse after it becomes true because the output signal from flip-flop 64 is coupled back to the K input. $Q_5$ is set false one clock pulse after $Q_4$ becomes false or, with respect to itself, two clock pulses after it was set true. The output signal $Q_5$ is coupled from flip-flop 66 to AND gate 68. $\overline{Q_4}$ is the other input to flip-flop 68. $\overline{Q_4}$ becomes true as $Q_4$ goes false. When both inputs to AND gate 68, i.e., $\overline{Q_4}$ and $Q_5$ are true, the output of AND gate 68 is true. The true output of AND gate 68 is coupled to the K input of flip-flop 66. Therefore, one clock pulse after $Q_4$ becomes false, $Q_5$ also becomes false. When $Q_5$ becomes false, clock pulses from clock pulse generator 48 no longer pass through AND gate 54. At this point, the "units" decade counter 50 has counted the number of "units" from zero to the start of the sequence for which the median is to be determined plus every other bit in the sequence. The total count is then the number of "units" from zero to the median "units" character in a sequence.

Consider now the circuitry for the "tens" signals. As stated above, each pulse "tens" signal is buffered by an amplifier 10 and delayed by a time delay of $T_1$ by a corresponding monostable nultivibrator 12 to allow sampling of the signals regardless of any leading edge skew of the signals.

In the example chosen, the input signals for which the median is to be determined represent the decimal numbers 38', 39', 40', 41' and 42'. Thus, the output signals of monostable multivibrators 12 for the 30' and 40' "tens" signals will be true and the output signals of all other monostable multivibrators 12 for the remaining "tens" signals will be false. The problem for the "tens" circuitry is to determine which one of two or more input "tens" signals is the correct "tens" signal for the median number of the sequence.

For convenient reference, each monostable multivibrator 12 in the "tens" circuitry is labeled in FIGS. 1*a* and 1*b* with its respective "tens" signal such as, for example, 00', 10', etc. The output signals from monostable multivibrators 00' through 70' are coupled to NOR gates 70, 72, 74, 76, 80 and 82. With no input signal to the monostable multivibrator, their normal output states are false for the 00' output, true for the $\overline{00'}$ output, false for the 10' output, true for the $\overline{10'}$ output, etc. The input signals to NOR gate 70 are 00' and $\overline{10'}$. The input signals to NOR gate 72 are 10' and $\overline{20'}$. The input signals to NOR gate 74 are 20' and $\overline{30'}$. NOR gates 76, 78, 80 and 82 are similarly connected to monostable multivibrators.

If one or more inputs to the NOR gates 70–82 is true, the output of the NOR gate will be false. Thus, according to the manner in which NOR gates 70–82 are connected to the monostable multivibrators 00'–70', only one NOR gate of the seven shown in FIG. 1 may have a true output at any one time. Furthermore, the logic circuits described thus far will depict the lesser of two more true "tens" input signals representing a true output signal from one of the NOR gates 70–82. The output signals from NOR gate 70 is the logic term ($\overline{00'}$ and 10'). The output signal from NOR gate 72 is the logic term ($\overline{10'}$ and 20'), and so on.

The output signals from NOR gates 70–82 are coupled to NOR gates 84, 86 and 88. Input signals to Nor gate 84 are ($\overline{00'}$ and 10'), ($\overline{20'}$ · 30'), ($\overline{40'}$ · 50') and ($\overline{60'}$ · 70'). The input signals to NOR gates 86 and 88 are similar combinations of signals from NOR gates 70–82. Again, output signals from NOR gates 84, 86 and 88 will be false if one or more of the input signals go true.

NOR gates 90, 92 and 94 invert the output signals from NOR gates 84, 86 and 88 respectively. The logic of each pair of NOR gates 84 and 90, 86 and 92, and 88 and 94 is that of an OR gate. The inversion of the signal in NOR gates 90, 92 and 94 converts the output signals from these gates to binary coded decimal signals. The output of NOR gate 90 is ($\overline{00'}$ · 10') + ($\overline{20'}$ · 30') + ($\overline{40'}$ · 50') + ($\overline{60'}$ · 70').

"Tens" decade counter 96 receives output signals of NOR gates 90, 92 and 94, setting in an initial state corresponding to the lesser of the "tens" signals received. When the input signal to counter 96 from NOR gate 90 is true, counter 96 is set to a number one state. When the output signal from NOR gate 92 is true, the output of counter 96 is set to a number two state corresponding to a "tens" signal of 20'. When the output signal of NOR gate 94 is true, the output of counter 96 is set to a four state. Thus, it is seen that the "tens" decade counter 96 will indicate in binary coded decimal form the least significant input to "tens" amplifiers 00' through 70'. If "units" decade counter 50 counts more than 10 pulses (from the initial 0' condition through 9') the carry pulse is generated in the "units" decade counter 50. This carry pulse causes the "tens" decade counter 96 to count to the next higher significant state.

"Units" readout 98 and "tens" readout 100 may be any conventional digital or analog device for converting a binary coded decimal signal to a decimal output signal such as tubes which give a visual presentation, for example.

Consider now the operation of the device using the example of the decimal sequence 38', 39', 40', 41' and 42', as the sequence for which the median 40 is to be determined.

Consider next the operation of the circuitry on "units" signals 8', 9', 0', 1' and 2'. These unit characters will be received by the corresponding "units" amplifiers 10 and are all loaded in a corresponding flip-flop of "units" register 14. For example, unit characters 8', 9', 0', 1' and 2' will be loaded in flip-flops 32, 34, 16, 18 and 20 respectively. For reference to the timing diagram of FIG. 2, these flip-flops of unit register 14 correspond to signals SR 9, SR 10, SR 1, SR 2 and SR 3 respectively.

Figure 2:
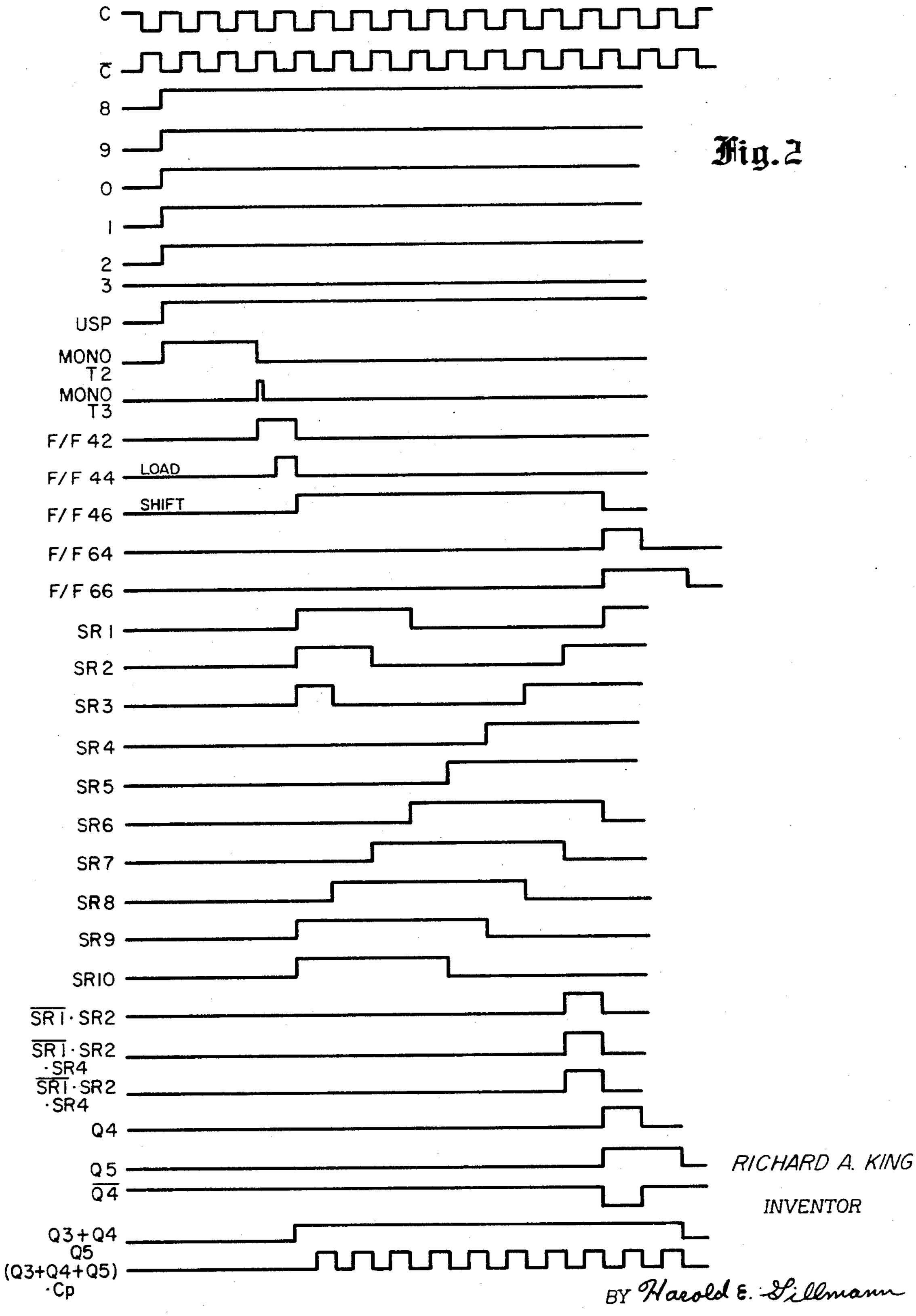
FIG. 2 is a timing diagram showing the timing of signals generated in the preferred embodiment.

In FIG. 2 the LOAD signal goes true after time delay $T_3$ goes true. The unit characters are then loaded in the flip-flops with SR 9, SR 10, SR 1, SR 2 and SR 3 becoming true in response to the input signals.

The shift signal goes true one clock pulse after the LOAD signal becomes true. Each clock pulse thereafter the unit characters are shifted down the register until the first true bit in the sequence becomes stored in flip-flop 18 according to the logic $\overline{SR\ 1} \cdot SR\ 2$. This time is shown on the timing diagram, FIG. 2, at the point where SR 2 becomes true.

For each shift of the shift register 14 "units" decade counter counts one pulse. On the timing diagram of FIG. 2, the input signal to "units" decade counter 50 is shown as $(Q_3 + Q_4 + Q_5) \cdot C_p$. At the time when SR 2 becomes true $\overline{SR\ 1}$ is still true. Eight clock pulses will have been counted by "units" counter 50 including the clock pulse occuring at the time SR 1 becomes true at the end of shifting. Assuming for the moment that the "tens" decade counter 96 indicates an output of 30', the "units" decade counter has counted from 30' to 38' and must count two more pulses in order to arrive at the median number 40.

The "units" decade counter 50 continues to count if either $Q_4$ or $Q_5$ are true. The logic of $Q_4$ and $Q_5$ is discussed above. $Q_5$ remains true for two clock pulses because it cannot become false until at least one clock pulse after $Q_4$ becomes false. Thus, two additional pulses are counted by "units" decade counter 50 making a total of ten pulses and generating a carry pulse which is coupled to "tens" decade counter 96 causing it to increment to 40. A total count of ten by "units" decade counter 50 is a count from an initial 0 position to a 0 position. This is the desired result because the units character of the median number, 40', is 0'.

Turning now to the operation of the "tens" circuitry using the example of a decimal sequence of 38', 39', 40', 41' and 42'. The output signal 30' and 40' from "tens" monostable multivibrators 12 becomes true in response to input signals representing 30' and 40' to "tens" amplifiers 10. Thus, the output signals from monostable multivibrator 30' and 40' are reversed from the normal state in that 30' becomes true and 40' becomes true and $\overline{30'}$ and $\overline{40'}$ both become false. The only NOR gate of NOR gates 70–82 which has a true output is NOR gate 74 because both of its inputs 20' and $\overline{30'}$ are false. The true output signal from NOR gate 74, represented by logic $\overline{20'} \cdot 30'$ is coupled to the inputs of NOR gates 84 and 86. The outputs of NOR gates 84 and 86 become false because this one input to each of these NOR gates has become true. The output of NOR gate 88 remains true because all four of its inputs are false. NOR gates 90 and 92 invert the respective output signals from NOR gates 84 and 86 and thus produce true outputs. Similarly NOR gate 94 inverts the output of NOR gate 88 and produces a false output. Thus, the input to "tens" decade counter 96 for the one state and the two state has become true indicating a "tens" character of 30' which is directly set into the "tens" decade counter 96. In addition the carry signal from "units" decade counter 50 increases the "tens" count by one producing an output in the "tens" decade counter of 40'. Thus, the circuitry has produced the median count of 40'.

I claim:

1. In a system for producing a signal representing the median number in a sequence of numbers in a number system having at least two orders, the combination comprising:

a. a source of clock pulses;

b. a shift register for shifting input signals representing a first sequence of numbers of a least significant order in response to successive pulses from said clock source;

c. a means for counting responsive to pulses from said clock source and connected to said shift register, said counter means counting each shift of said register until a one representing the first number in said first sequence is shifted to the last bit position of said register and further counting alternate ones stored in said register to determine the median number in said first sequence; and d. a logic circuit for receiving a second sequence of numbers of second order in said number system and for determining the least significant character in said second sequence, said logic circuit responsive to said counter for increasing its determination by one character whenever the number of pulses counted by said counter exceeds the radix of said least significant order thereby determining the second order character of the median number in said sequence of numbers having two orders.

2. A decoding system for determining the median character in a sequence of characters in a predetermined number system comprising:

a. a source of clock pulses;

b. a first plurality of input terminals for receiving a first set of binary signals, each binary signal in said first set representing one first order character in a number system having a first predetermined radix, said first set of signals including a first sequence of signals each having a predetermined logical state;

c. a second plurality of input terminals for receiving a second set of binary signals, each binary signal in said second set representing a second order character in the set to said radix predetermined number system, said second set of signals including a second sequence having a predetermined logical state;

d. a shift register connected to said first plurality of input terminals for receiving said first set of binary signals, said shift register having a bit storing device corresponding to each of the characters in said first set of binary signals, said shift register transferring each character in said first set to a bit storing device until the first character in said first sequence having said predetermined logical state is transferred to the bit storing device of said shift register corresponding to the lowest character in said first set of binary signals in response to clock pulses;

e. a means for counting responsive to pulses from said clock source and connected to said shift register, said counter means counting the number of shifts in said register to transfer the first character in the first sequence having the predetermined logical state plus counting the number of alternate characters in the sequence having the predetermined logical state to determine and indicate the median character in the first sequence of characters in said first set of binary signals having the predetermined logical state; and f. a logic circuit connected to said second plurality of terminals for receiving said second set of binary signals, said logic circuit determining the lowest second order character in said second sequence in said second set of binary signals having the same predetermined logical state said logic circuit coupled to said counter means for receiving a carry signal when the total counted by said counter means exceeds said predetermined first radix, said logic circuit increasing said second order character by one in response to a carry signal.

3. The device as claimed in claim 2 wherein said logic circuit includes a counter.

* * * * *